(12) United States Patent
Roman et al.

(10) Patent No.: US 7,191,462 B1
(45) Date of Patent: Mar. 13, 2007

(54) SYSTEM FOR TRANSMITTING VIDEO IMAGES OVER A COMPUTER NETWORK TO A REMOTE RECEIVER

(75) Inventors: Kendyl A. Roman, 730 Bantry Ct., Sunnyvale, CA (US) 94087; Carl P. Daniel, El Dorado Hills, CA (US)

(73) Assignee: Kendyl A. Román, Sunnyvale, CA (US)

( * ) Notice: Subject to any disclaimer, the term of this patent is extended or adjusted under 35 U.S.C. 154(b) by 0 days.

(21) Appl. No.: 09/436,432

(22) Filed: Nov. 8, 1999

(51) Int. Cl.
*H04N 7/173* (2006.01)

(52) U.S. Cl. ............................. 725/98; 725/86; 725/92; 725/109

(58) Field of Classification Search .................. 725/86, 725/109, 110, 92, 98, 100; 709/230, 231
See application file for complete search history.

(56) References Cited

U.S. PATENT DOCUMENTS

| | | | |
|---|---|---|---|
| 4,301,469 A | 11/1981 | Modeen et al. | 358/75 |
| 4,302,775 A | 11/1981 | Widergren et al. | 358/136 |
| 4,385,363 A | 5/1983 | Widergren et al. | 364/725 |
| 4,394,774 A | 7/1983 | Widergren et al. | 382/56 |
| 4,410,916 A | 10/1983 | Pratt et al. | 358/236 |
| 4,546,385 A | 10/1985 | Anastassiou | 358/133 |
| 4,550,437 A | 10/1985 | Kobayashi | 345/536 |
| 4,646,356 A | 2/1987 | Anderson et al. | 382/56 |
| 4,698,672 A | 10/1987 | Chen et al. | 358/136 |
| 4,704,628 A | 11/1987 | Chen et al. | 358/136 |
| 4,743,959 A | 5/1988 | Frederiksen | 358/11 |
| 5,014,710 A | 5/1991 | Maslak et al. | 128/660.5 |
| 5,046,027 A * | 9/1991 | Taaffe et al. | 345/557 |
| 5,047,853 A | 9/1991 | Hoffert et al. | 358/133 |
| 5,271,072 A | 12/1993 | Yoshida et al. | 382/56 |
| 5,287,452 A | 2/1994 | Newman | 345/520 |
| 5,309,232 A | 5/1994 | Hartung et al. | 348/384 |
| 5,416,602 A * | 5/1995 | Inga et al. | 358/403 |

(Continued)

FOREIGN PATENT DOCUMENTS

WO    WO 99/59472    11/1999

*Primary Examiner*—Kieu-Oanh Bui

(57) ABSTRACT

A method of and apparatus for transmitting video images allows a viewer to receive at a receiving display device, all or a selected portion of a video stream of frames, in a storage-efficient format from a transmitting device and view the received video stream of frames before the transmission is complete. The video system also allows a viewer to receive at the receiving device, all or a selected portion of a video stream of frames, in a high-resolution format, by marking sections of interest within the received stream of frames in the storage-efficient format and requesting enhancement of those marked sections of interest. This apparatus preferably includes a source device, a transmitting device and at least one receiving device. Preferably, the transmitting device and the receiving device communicate over a network such as the Internet Protocol network. Alternatively, the transmitting device and the receiving device communicate over any appropriate data network. The transmitting device transmits the video images to the receiving device for display and storage at the receiving device. The receiving device is also capable of communicating with the transmitting device while simultaneously receiving video images. The source device is preferably a medical test device such as an ultrasound, a sonogram, an echocardiogram, and the like. Alternatively, the source device can be any video capture or storage device capable of sourcing a stream of video frames.

34 Claims, 2 Drawing Sheets

U.S. PATENT DOCUMENTS

| | | | |
|---|---|---|---|
| 5,471,989 A | 12/1995 | Roundhill et al. | 128/660.04 |
| 5,552,832 A | 9/1996 | Astle | 348/420 |
| 5,581,613 A | 12/1996 | Nagashima et al. | 380/201 |
| 5,583,561 A * | 12/1996 | Baker et al. | 725/93 |
| 5,619,995 A * | 4/1997 | Lobodzinski | 600/425 |
| 5,621,660 A | 4/1997 | Chaddha et al. | 364/514 |
| 5,646,618 A | 7/1997 | Walsh | 341/67 |
| 5,715,823 A * | 2/1998 | Wood et al. | 600/437 |
| 5,721,815 A * | 2/1998 | Ottesen et al. | 345/721 |
| 5,754,820 A | 5/1998 | Yamagami | 711/133 |
| 5,812,119 A | 9/1998 | Tateyama | 128/660.5 |
| 5,812,788 A | 9/1998 | Agarwal | 395/200.7 |
| 5,882,206 A | 3/1999 | Gillio | 434/262 |
| 5,897,498 A | 4/1999 | Canfield, II et al. | 600/437 |
| 5,920,317 A | 7/1999 | McDonald | 345/853 |
| 5,959,639 A | 9/1999 | Wada | 345/542 |
| 5,999,655 A | 12/1999 | Kalker et al. | 382/234 |
| 6,005,979 A | 12/1999 | Chang et al. | 382/232 |
| 6,009,346 A | 12/1999 | Ostrow | 604/20 |
| 6,018,713 A * | 1/2000 | Coli et al. | 705/2 |
| 6,025,854 A | 2/2000 | Hinz et al. | 345/538 |
| 6,054,990 A | 4/2000 | Tran | 345/358 |
| 6,058,215 A | 5/2000 | Schwartz et al. | 382/244 |
| 6,063,032 A | 5/2000 | Grunwald | 348/440 |
| 6,064,324 A | 5/2000 | Shimizu et al. | 341/50 |
| 6,078,691 A | 6/2000 | Luttmer | 382/235 |
| 6,091,777 A | 7/2000 | Guetz et al. | 375/240 |
| 6,115,485 A | 9/2000 | Dumoulin et al. | 382/128 |
| 6,144,392 A | 11/2000 | Rogers | 345/537 |
| 6,181,711 B1 | 1/2001 | Zhang et al. | 370/468 |
| 6,219,358 B1 | 4/2001 | Pinder et al. | 370/537 |
| 6,324,599 B1 | 11/2001 | Zhou et al. | 710/26 |
| 6,335,990 B1 | 1/2002 | Chen et al. | 382/261 |
| 6,338,119 B1 | 1/2002 | Anderson et al. | 710/22 |
| 6,339,616 B1 | 1/2002 | Kovalev | 375/240.16 |
| 6,384,862 B1 | 5/2002 | Brusewitz et al. | 348/212 |
| 6,571,392 B1 * | 5/2003 | Zigmond et al. | 725/110 |
| 6,592,629 B1 | 7/2003 | Cullen et al. | 709/232 |
| 6,651,113 B1 | 11/2003 | Grimsrud | 710/22 |
| 2001/0021260 A1 | 9/2001 | Chung et al. | 382/235 |

* cited by examiner

SYSTEM FOR TRANSMITTING VIDEO IMAGES OVER A COMPUTER NETWORK TO A REMOTE RECEIVER

FIELD OF THE INVENTION

The present invention relates to the field of communications systems. More particularly, the present invention relates to the field of video communications systems transmitting video data from a source device to a receiving device.

BACKGROUND OF THE INVENTION

In the last decade, there have been tremendous advances in medical devices which have greatly improved the ability to diagnose and treat patients. Ultrasounds, sonograms and echocardiograms are just a few modern tools developed to accurately diagnose patients with coronary problems, kidney stones, tumors, and other diseases without conducting risky and expensive exploratory surgeries. These tools are especially useful because they have the capability of being more accurate than exploratory surgeries and do not pose an additional risk to patients.

Given the benefits of ultrasounds, sonograms and echocardiograms these tools are in widespread use in many hospitals, clinics, testing facilities, and individual doctors' offices. Many doctors primarily base their diagnosis on the results from ultrasounds, sonograms and echocardiograms. While these tools allow doctors to make their diagnosis without costly, risky, and time consuming exploratory surgeries, an error in administering an ultrasound, sonogram and echocardiogram can lead to a wrong diagnosis. A wrong diagnosis can be catastrophic for the patient. By receiving an incorrect diagnosis, the patient can potentially fail to receive needed medical treatment and/or be unnecessarily treated. Whether needed medical treatment is withheld or unnecessary medical treatment is given due to an erroneous test result from an ultrasound, sonogram and echocardiogram, the patient unnecessarily suffers.

The doctor is generally not at the test when the study is performed on the patient. The tests are typically performed and later reviewed by the doctor after the patient has left the technician's office. The test is recorded in a video or movie format and then later played by the doctor to make their diagnosis.

A video picture or frame is made up of a number of horizontal lines included within the video display. To display a video picture or frame the video system begins at the top of the screen and displays the information within the composite video signal one horizontal line at a time. The information for each horizontal line is contained within a horizontal period of the composite video signal. After each horizontal period, the video system moves to the next line and displays the information within the next horizontal period of the composite video system. This continues until the video system reaches the bottom line on the video display. After displaying the video information on the bottom line of the video display, the video system must reset itself to the top of the display in order to begin displaying the next frame. In order to allow the system to reset itself to the top of the video display a vertical blanking period is included within the composite video signal, after the video information for each frame. This vertical blanking period allows the video system to reset to the top of the video display and begin displaying the information for the horizontal lines of the next frame. Therefore, a number of horizontal periods, enough to comprise a frame or screen, are strung together, within the composite video signal. Between each frame, the composite video signal includes a vertical blanking period which allows the video system to perform a vertical reset and prepare to display the next frame by moving back up to the top of the video display.

A schematic block diagram of a typical configuration including a display device 10 and an external image source 12 coupled together through a network 14 is illustrated in FIG. 1. The network 14 can be an intranet connection, Internet connection or a direct connection between the display device 10 and the external image source 12. A user can view a movie or stream of video frames at the display device 10 which is transmitted from the source device 12. Currently, such a video stream can be transmitted from the source device 12 to the display device 10 in a number of ways. In order to view a movie transmitted from the source device 12, at the display device 10, in typical systems, the entire video stream of frames within the movie is transmitted and stored at the display device 10 and then viewed by the user. This method has the disadvantage that it can be very time consuming, because it requires that the entire movie is sent to the display device 10, before viewing of the movie can begin at the display device 10. Depending on the size of the movie and the speed of the connection between the display device 10 and the source device 12, this can be a significant delay from the time the video stream is transmitted until the user can start watching the movie at the display device 10.

In another prior system, frames of the movie are sent interactively as the movie was recorded. This has the disadvantage of requiring the movie to be transmitted in the format in which it was recorded. This format may not be suitable for efficient transmission. This system also has the disadvantage that the movie is not stored at the display device 10 and must be re-transmitted for each viewing.

In still another prior system, frames of the movie are interactively transcoded to a storage-efficient encoding format either before transmission or as the frames are being transmitted. This system has the disadvantage of not allowing the viewer to see frames of the movie as originally recorded. Depending on the encoding format used, a user of such a system may notice a significant decrease in image quality. This system also has the disadvantage that the movie is not stored at the display device and must be re-transmitted for each viewing.

SUMMARY OF THE INVENTION

A method of and apparatus for transmitting video images allows a viewer to receive at a receiving display device, all or a selected portion of a video stream of frames, in a storage-efficient format from a transmitting device and view the received video stream of frames before the transmission is complete. The video system also allows a viewer to receive at the receiving device, all or a selected portion of a video stream of frames, in a high-resolution format, by marking sections of interest within the received stream of frames in the storage-efficient format and requesting enhancement of those marked sections of interest. This apparatus preferably includes a source device, a transmitting device and at least one receiving device. Preferably, the transmitting device and the receiving device communicate over a network such as the Internet Protocol network. Alternatively, the transmitting device and the receiving device communicate over any appropriate data network. The transmitting device transmits the video images to the receiving device for display and storage at the receiving device. The receiving device is also capable of communicating with the transmitting device while simultaneously receiving video images. The source device is preferably a medical test device such as an ultrasound, a sonogram, an echocardiogram, and the like. Alternatively, the source device can be any video capture or storage device capable of sourcing a stream of video frames.

In one aspect of the present invention, a method of transmitting a video stream of images from a source device to a receiving device includes the steps of transmitting the video stream of images in a first format to the receiving device, receiving a request for an enhanced version of a marked portion of the video stream of images from the receiving device and transmitting the marked portion of the video stream of images in a second format, wherein the second format represents an enhanced version of the first format. The method further includes the step of storing the original video stream of images at the receiving device. The method further includes the step of storing the marked portion of the video stream of images to replace a corresponding portion of the original video stream of images. The method further includes the step of generating the video stream of images and transmitting the video stream of images to the source device. Preferably, the step of generating is performed by a medical test device which is one of the group of an ultrasound, sonogram and echocardiogram device. The method further includes the step of displaying the video stream of images at the receiving device. The method further includes the step of marking the marked portion of the video stream of images at the receiving device. The step of displaying includes a fast-forward and rewind function. The step of transmitting the video stream of images and the step of displaying are performed simultaneously such that a received portion of the video stream of images is displayed while a remaining portion of the video stream of images is transmitted. The method further includes the step of adding annotations to the video stream of images. The method further includes the step of determining if a user views a particular image within the video stream of images for a predetermined period of time and automatically transmitting the particular image in the second format. If the request for an enhanced version is received while the step of transmitting the video stream of images is being performed, then the step of transmitting the video stream of images is paused while the step of transmitting the marked portion is performed, and resumed once the step of transmitting the marked portion is completed.

In another aspect of the present invention, a transmitting device for transmitting a video stream of images to a receiving device includes a storage device configured for receiving and storing a stream of images and a controller coupled to the storage device and configured for coupling to the receiving device for controlling transmission of the stream of images from the storage device to the receiving device, wherein the stream of images are transmitted to the receiving device in a first format and then a requested portion of the stream of images are transmitted to the receiving device in a second format, and further wherein the second format represents an enhanced version of the first format. The transmitting device further includes a source device coupled to the storage device for generating the stream of images and transmitting the stream of images to the storage device. The source device is preferably a medical test device which is one of an ultrasound, a sonogram and an echocardiogram. The transmitting device further includes a network interface circuit coupled to the storage device and to the controller for communicating with the receiving device over a network. The receiving device includes a display for displaying the stream of images and an input device for marking the requested portion of the stream of images. The network is preferably an Internet Protocol network. Received frames within the stream of images are displayed at the receiving device while a remaining portion of the stream of images is transmitted. The receiving device further includes a received storage device for storing the stream of images. The requested portion of the stream of images is stored in the second format and a remaining portion of the stream of images is stored in the first format at the received storage device.

In yet another aspect of the present invention, a system for transmitting a video stream of images from a source device to a receiving device includes a source device for generating the video stream of images, a transmitting device coupled to the source device to receive and store the video stream of images and a receiving device coupled to the transmitting device to receive the video stream of images in a first format, display the video stream of images for a user to mark one or more sections of interest, transmit a request for an enhanced version of the sections of interest and receive from the transmitting device the sections of interest within the video stream of images in a second format, wherein the second format represents an enhanced version of the first format. The source device is preferably a medical test device which is one of an ultrasound, a sonogram and an echocardiogram. The receiving device is coupled to the transmitting device through a network. The receiving device includes a display for displaying the stream of images and an input device for marking the requested portion of the stream of images. The receiving device further includes a received storage device for storing the video stream of images. The sections of interest within the video stream of images are stored in the second format and a remaining portion of the video stream of images is stored in the first format at the received storage device. Received frames within the video stream of images are displayed at the receiving device while a remaining portion of the video stream of images is transmitted.

In still another aspect of the present invention, a method of transmitting a video stream of images from a source to a receiving device for display and storage at the receiving device includes the steps of transmitting the video stream of images in a first format to the receiving device, displaying the video stream of images in the first format at the receiving device, allowing a user to mark sections of interest within the video stream of images and transmitting the sections of interest to the receiving device in a second format, wherein the second format represents an enhanced version of the first format. The method further includes the step of displaying the sections of interest in the second format at the receiving device. The method further includes the step of storing the sections of interest in the second format and a remaining portion of the video stream of images in the first format at the receiving device. The step of transmitting the video stream of images and the step of displaying the video stream of images in the first format are performed simultaneously, such that a received portion of the video stream of images is displayed while a remaining portion of the video stream of images is transmitted. The step of displaying includes a fast-forward and rewind function. The method further includes the step of generating the video stream of images and transmitting the video stream of images to the source device. The step of generating is preferably performed by a medical test device which is one of a group of an ultrasound, sonogram and echocardiogram device.

DETAILED DESCRIPTION OF THE PREFERRED EMBODIMENT

The video system of the present invention includes a video source device, such as an ultrasound, sonogram or echocardiogram device, which generates video images. A transmitting device coupled to the video source device receives and stores the video images in collections or movies. The transmitting device is also configured to be coupled to a server and one or more receiving devices through a network for transmitting the captured movies. The transmitting device can either transmit the movies directly to a receiving device or to the server for storage. If stored at the server, a receiving device can access the server through the network to download a movie.

When downloaded from either the server or the transmitting device to a receiving device, the frames are first transmitted in a low-resolution, storage-efficient format. A user can view received frames in the storage-efficient format, at the receiving device, as the remaining frames within the movie are being transmitted. The user can also mark sections of interest within the movie as they are viewing the movie. When the user then activates an enhance function, the frames within the marked sections of interest are sent from the server or transmitting device to the receiving device in an enhanced, high-resolution format for viewing by the user at the receiving device.

As frames are received at the receiving device, the data representing the frames is stored at the receiving device. If an enhanced, high-resolution version of a frame is received at the receiving device, the enhanced, high-resolution version of the frame is saved over the storage-efficient format of the frame which was previously received.

Figure 2:
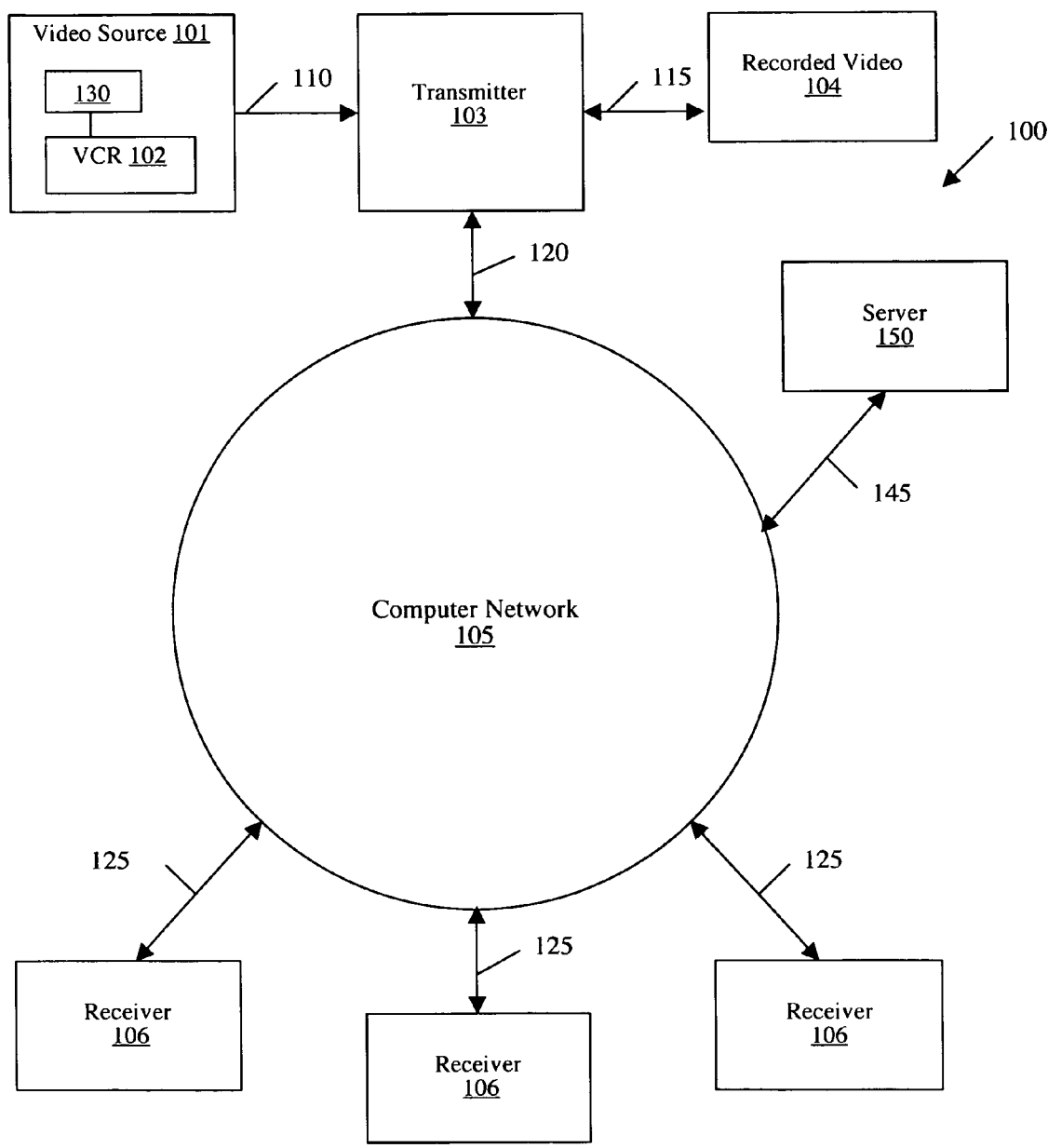
FIG. 2 illustrates a block diagram of a video system according to the present invention for transmitting video images from one location to another.

FIG. 2 illustrates a video system 100 according to the present invention for transmitting video images from one location to another. The video system 100 preferably includes a video source 101, a video cassette recorder 102, a transmitter 103, a recorded video device 104, a computer network 105, a server 150, a plurality of receivers 106, and data links 110, 115, 120, 125 and 145. Preferably, the video source 101 includes the video cassette recorder 102 or other storage means, such as a hard disk or writable CD-Rom, and is coupled to the transmitter 103 via the data link 110. The data link 110 is preferably a Super-Video (S-Video) connection. The transmitter 103 is also preferably coupled to the recorded video device 104 and the computer network 105 via the data links 115 and 120, respectively.

Preferably, the server 150 is coupled to the computer network 105 through the datalink 145. Preferably, the plurality of receivers 106 are coupled to the computer network 105 via the data links 125. Each of the plurality of receivers 106 are preferably a computer system having a display, central processing unit, and input device. The data links 120, 125 and 145 preferably link each of the plurality of receivers 106 to the computer network 105. The data links 125 include any appropriate connection to the computer network 105 including T1 communication lines, DSL links, cellular links, microwave transmission, land lines, twisted pair cable, and the like. The video system 100 shown in FIG. 2 is merely illustrative and is only meant to show the preferred embodiment of the present invention. In alternate embodiments, additional servers, transmitters, video sources, and receivers could be included without departing from the spirit and scope of the video system 100.

The video source 101 preferably provides the video system 100 with at least one video image. The video source 101 is capable of providing either a real-time video image or a pre-recorded video image. For example, to provide a real-time video image, the video source 101 preferably includes a real-time input device 130. This real-time input device 130 is preferably a medical measurement device such as an ultrasound, sonogram and echocardiogram, and the like. Alternatively, this real-time input device 130 could be any other appropriate image capturing device including a video camera and a still camera. The pre-recorded video image is preferably provided by the storage device 102. Preferably, the storage device 102 is configured to record the real-time video images produced by the real-time input device 130 and play these pre-recorded video images at a later time. In addition to recording real-time video images and re-playing them, the video cassette recorder 102 is also preferably configured to accept and play a pre-recorded video cassette tape. The video source 101 is preferably configured to transfer the video image to the transmitter 103 via the data link 110.

The recorded video device 104 is preferably coupled to the transmitter 103 via the data link 115. Preferably, the recorded video device 104 stores video images received by the transmitter 103 for playback at a later time. The recorded video device 104 allows the transmitter 103 to distribute these video images to the server 150 and the plurality of receivers 106 at a later time. In addition, the recorded video device 104 also preferably serves as a mass storage device to store data that is unrelated to the video images.

The transmitter 103 preferably controls the flow of video images from both the video source 101 and the recorded video component 104 over the computer network 105 to any number of the plurality of receivers 106, directly, or to the server 150. The transmitter 103 preferably compresses the video images in any known format prior to transmission to one of the plurality of receivers 106 or to the server 150. Further, the transmitter 103 preferably monitors and selectively establishes connections with the computer network 105 over the data link 120.

In the video system 100, the computer network 105 is preferably an Internet Protocol network. In alternate embodiments, the computer network 105 is any appropriate data network, including a direct connection. The computer network 105 is configured to transmit information between the server 150, the plurality of receivers 106 and the transmitter 103.

The plurality of receivers 106 are preferably configured to selectively receive a stream of video images from the transmitter 103 or from the server 150 over the computer network 105. For example, at least one of the plurality of receivers 106 is programmed to receive a stream of video images from the transmitter 103 or from the server 150. Accordingly, only the selected ones of the plurality of receivers 106 are capable of receiving the stream of video images from the transmitter 103 or from the server 150. In addition to receiving the stream of video images, the selected ones of the plurality of receivers 106 are also capable of transmitting instructions to the transmitter 103 or to the server 150 over the computer network 105.

The plurality of receivers 106 preferably reside in a remote location relative to the transmitter 103 and the server 150. Preferably, the plurality of receivers 106 selectively receive the flow of video images from the transmitter 103 or the server 150 and also selectively respond to the transmitter 103 or the server 150 with instructions.

Each of the plurality of receivers 106 preferably includes a video controller, a video client, and a video play device. Preferably, the video controller relays information regarding the frame size, frame rate, compression algorithm, and other parameters being transmitted to the transmitter 103 or to the server 150, as appropriate. Thus, a user interfacing with one of the plurality of receivers 106 is able to modify the frame size, frame rate, compression algorithm, and other parameters of the incoming stream of video images to one of the plurality of receivers 106. Since the plurality of receivers 106, the transmitter 103 and the server 150 are preferably located in remote locations, by interfacing with the video controller of the receiver 106, the user is able to remotely control video parameters such as frame size, frame rate, compression algorithm, and the like which are included within the video settings at the transmitter 103 or the server 150.

The receiving device 106 preferably receives the compressed stream of video images from the server 150 or the transmitter 103. The video client within the receiving device 106 preferably includes a decompressor which is configured to decompress the compressed stream of video images to form a representation of the original, uncompressed stream of video images. After the compressed stream of video images is processed by the decompressor, the resulting stream of video images is ready to be displayed.

In operation, when transmitting directly to the receiving devices 106, the transmitter 103 acts as a server that is connected to an appropriate data network. For most movies captured by the transmitter 103, within the preferred embodiment of the present invention, the transmitter 103 will transmit the movies for storage at the server 150. The server 150 then will transmit the movies to the receiving devices 106, as appropriate, when the receiving devices 106 access the server 150 over the computer network 105.

Figure 1:
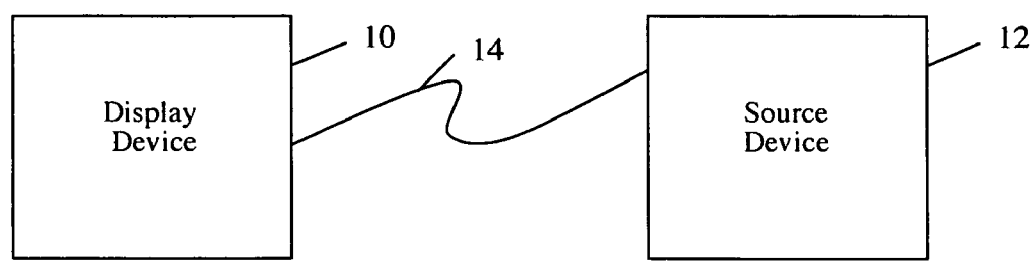
FIG. 1 illustrates a schematic block diagram of a typical configuration including a display device and an external image source coupled together through a network.

Preferably, each of the plurality of receivers 106 individually acts as a stand-alone computer system connected to the data network. The server 150 selectively enables a data stream of video images to be transmitted to an appropriate one or more of the plurality of receivers 106. In order for a particular receiver 106 to receive the data stream of video images from the transmitter 103, the receiver 106 logs onto the server 150 through the computer network 105. Preferably, the computer network 105 is the Internet Protocol network. Alternatively, the computer network 105 is any appropriate data network. Typically, in the preferred embodiment, this log on is accomplished by connecting through an Internet service provider. A connection between the server 150 and the particular receiver 106 is preferably established through the computer network 105 (FIG. 1). The particular receiver 106 preferably communicates with the server 150 over the computer network 105 and furnishes a user identification, a password, or another form of identification and verification. Once the server 150 identifies the particular receiver 106 as an approved user, the server 150 allows the data stream of video images to be transmitted to the particular receiver 106 over the computer network 105. The transmitter 103 is capable of simultaneously transmitting the data stream of video images to multiple receivers 106, if appropriate.

When receiving a movie or recorded stream of video images from either a transmitter 103 or the server 150, utilizing the video system of the present invention, a receiving device 106 receives all or a selected portion of the movie in a storage-efficient format. This storage-efficient format allows a faster transmission of the movie from either a transmitter 103 or the server 150 to a receiving device 106, but provides the user a lesser quality video picture when displayed on the receiving device 106. The user then views the movie in this storage-efficient format in order to determine if there are portions of the movie that the user wants to see in an enhanced format. The user does not have to wait for the entire movie to be received, but can begin viewing the transmitted frames in the storage-efficient format as the remaining video frame data within the movie is being transmitted to the receiving device 106.

While viewing the movie in the storage-efficient format, the user can mark portions of the movie, referred to herein as sections of interest, to receive in an enhanced, high-resolution format. The receiving device 106 then transmits a request to the appropriate one of the transmitting device 103 or the server 150 to receive the frames within the marked sections of interest in an enhanced, high-resolution format. In response to this request, the transmitting device 103 or the server 150 transmits the frames within the marked sections of interest in the high-resolution format. The user can then view the frames within the sections of interest in this high-resolution format. The user can also begin viewing transmitted enhanced frames while the remaining enhanced frames within the section of interest are being transmitted.

If the request for enhanced frames within a section of interest occurs while the transfer of portions of the movie in the storage-efficient format is being completed, then the transfer of frames within the storage-efficient format is preferably interrupted until the enhanced frames are transferred. After the enhanced frames within the sections of interest have been transferred, the transfer of frames within the storage efficient format is then resumed from the point that it was interrupted.

The receiving device 106 also preferably stores a local copy of the movie that is received from either the transmitting device 103 or the server 150, including both the storage-efficient frames and the enhanced frames within the sections of interest. When enhanced frames within a section of interest are received the enhanced frames are stored over the corresponding previously received frames in the storage-efficient format. Accordingly, the local copy of the movie will include frames in the enhanced format in marked sections of interest and frames within the storage-efficient format in the remaining portions of the movie. A user can use controls such as play, pause, fast-forward, reverse-play, rewind, skip to next mark and skip to previous mark, to interactively control the portion of the movie that is currently being displayed at the receiving device 106.

Preferably, a transmitting device 103 or server 150, for transmitting video frames to a receiving device 106, includes an open function which establishes a connection between a receiving device 106 and a movie stored at the transmitting device 103 or the server 150. The transmitting device 103 or server 150 also includes a transfer frames function which transfers a specified range of frames within a movie, encoded using a specified encoding scheme, to the requesting receiving device 106.

Preferably, a receiving device 106 for receiving video frames from a transmitting device 103 or the server 150 includes an open function which requests a connection to a movie stored on the transmitting device 103 or the server 150. The receiving device 106 also includes a mark-in function, used to establish a beginning or in-point of a section of interest within a movie to be transferred, and a mark-out function, used to establish an end or out-point of the section of interest to be transferred. The receiving device 106 also includes an enhance function which is used to request from the transmitting device 103 or the server 150, an enhanced, high-resolution copy of the frames between the in-point mark and the out-point mark, denoting the section of interest previously established by the user. As discussed above, the receiving device 106 also includes transport control functions such as play, pause, fast-forward, reverse-play, rewind, skip to next mark and skip to previous mark, which are used to control the display of frames within the movie being displayed.

The receiving device 106 also includes a status display function which displays the status of each frame of the movie, as it is being displayed, as well as the current position of the player and the location of any flags or markers in the movie. The status of a frame is one of either transferred, specifying that the frame has already been transferred from the transmitting device, not-transferred, specifying that the frame has not yet been transferred from the transmitting device or enhanced, specifying that the enhanced, high-resolution version of the frame has been transferred from the transmitting device. The receiving device 106 also includes an accept frames function which accepts frames sent from the transmitting device 103 or the server 150 and stores them in a local copy of the movie which is built interactively. When the connection to the transmitting device 103 or the server 150 is eventually closed, the local movie stored at the receiving device 106 is a valid movie which may be replayed on the receiving device 106 at any time. In this stored local copy, if enhanced versions of frames were received, then the enhanced versions of frames are preferably saved to replace the previously received storage-efficient version of the frames. Alternatively, both versions of frames are saved in the local copy at the receiving device 106.

The storage-efficient format in which the video frames of a movie are first transmitted from the transmitting device 103 or the server 150 to the receiving device 106 is a low-resolution format which allows the video frames to be transmitted much faster between the transmitting device 103 or the server 150 and the receiving device 106. In the preferred embodiment of the present invention, the storage-efficient format requires 150 kbytes per second. The storage-efficient format is a trade-off between speed and quality. Frames in this format can be transferred faster than in the high-resolution format, but the quality of the frames, when displayed, is poorer, due to the lower resolution. However, preferably, the quality of frames in the storage-efficient format is good enough to allow the viewer to see the basic images within the frame and determine whether or not they would like an enhanced version of the frame.

The enhanced, high-resolution format in which marked sections of interest are transmitted from the transmitting device 103 or the server 150 to the receiving device 106 takes longer to transmit than frames within the storage-efficient format. However, when displayed, the quality of frames in the enhanced, high-resolution format is much greater than in the storage-efficient format. In the preferred embodiment of the present invention, the enhanced, high-resolution format requires 2.5 Mbytes per second.

Used together, the storage-efficient format and the enhanced, high-resolution format allow a user to quickly and effectively determine sections of interest within the movie where they would like to see frames in the enhanced format. The storage-efficient format allows the video frames within the movie to be transmitted to the receiving device 106 faster to give the user an opportunity to watch the movie at the receiving device 106 and determine and mark sections of interest within the movie. The frames between the marked sections of interest are then sent in the enhanced, high-resolution format and stored with the movie to replace the relevant frames. The user can view these enhanced, high-resolution frames within the sections of interest. In this manner, the entire movie is not sent in the enhanced format, but only the frames within the sections of interest. A local copy of the movie is stored at the receiving device 106 which includes the enhanced, high-resolution frames within the sections of interest, and frames in the storage-efficient format in the remaining portions of the movie.

In an alternate embodiment of the present invention, multiple levels of enhancement are utilized. In this embodiment, the system remembers the enhancement level of each frame which has been downloaded. When a user marks a section of interest, frames within that section are then transmitted at the next enhancement level. The user can keep enhancing the section of interest, as appropriate, until either the highest enhancement level is transmitted or the user is satisfied with the quality of the frame, as displayed.

In an alternate embodiment of the present invention, the system automatically enhances the current image or section of images. In this embodiment, if the user lingers on a particular frame or group of frames for more than a predetermined time period, then the system automatically transmits the enhanced, high-resolution version of the frame or group of frames.

In the preferred embodiment of the present invention, the frames within the movie are downloaded sequentially in the storage-efficient format. In an alternate embodiment of the present invention, the system is not limited to a sequential download of the frames in the storage-efficient format. In this alternate embodiment, if the user sets the current position of the movie player to a point beyond all downloaded content, the system automatically begins downloading the frames at that chosen location in the movie in the storage-efficient format. The system will then later return to the skipped portion of the movie and download the frames within that portion.

In an alternate embodiment of the present invention, a user can stop or pause the downloading of a movie from a transmitting device 106 or the server 150 to a receiving device 106 at any time. In this embodiment, the user can then later resume the downloading of the movie at the point at which the downloading was previously stopped and with all previously enhanced sections retaining their enhanced status and content.

In an alternate embodiment of the present invention, a user can add annotations to the movie stored at the receiving device 106 and have those annotations sent to the transmitting device 103 or the server 150, as appropriate, and stored in the original movie file. This allows a user to annotate a movie which others download and view with the annotations.

In operation, within the system of the preferred embodiment of the present invention, a user at a receiving device 106, selects a movie to be viewed from a list of movies available on a remote transmitter 103 or server 150. Once the selection is made, the receiving device 106 automatically makes a request to the transmitter 103 or the server 150 to transfer all frames within the movie in the storage-efficient format. The user can begin to playback and view the movie at the receiving device 106 as soon as any frames are received, while the remainder of the movie is being downloaded. As the user plays or positions through the movie, the user uses the mark-in and mark-out functions to mark sections of interest within the movie. The user can position through the movie using the fast-forward, reverse-play, rewind, skip to next mark and skip to previous mark functions. The user then uses the enhance function to request transfer of the frames within the marked sections of interest in an enhanced, high-resolution format from the transmitter 103 or the server 150. When received at the receiving device 106, the frames in the enhanced, high-resolution format are saved to replace the previously received corresponding frame in the storage-efficient format. The user can begin to view the enhanced frames as soon as they are transferred and while the remainder of the enhanced frames are being transferred. If the request for enhanced frames occurred during the transfer of unenhanced frames, the transfer of unenhanced frames is interrupted until the enhanced frames are transferred, and then resumed after the transfer of enhanced frames is completed.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it should be apparent to those skilled in the art, that while the video system of the present invention is preferably used to transmit and display a video movie generated by a medical test device, the video system of the present invention can also be used to transmit and display any other type of video movie, image or series of images.

We claim:

1. A method of transmitting a video stream of images over a computer network from a first location to a second location in a first digitally compressed formal and then retransmitting, based on one or more actions of a user at the second location, at least a portion of the video stream of images in a higher quality second digitally compressed format, the method comprising the steps of:
   a) generating a plurality of images at a video source device at the first location;
   b) transferring the plurality of images from the video source device to a transmitting device in an original video format as a steam of video images;
   c) saving the plurality of images from the video source device on the transmitting device as a first saved stream of video images;
   d) converting the stream of video images from the original video format to the first digitally compressed format as each image is received from the video source device at the transmitting device,
      wherein the first digitally compressed format is a storage-efficient and transmission-efficient format having lower quality than the second digitally compressed format,
      wherein the frames of the video stream in the first digitally compressed format contain significantly less information than the second digitally compressed format;
   e) transmitting the video stream of images in the first digitally compressed format over the computer network from the transmitting device to a receiving device at the second location;
   f) saving the video stream of images in the first digitally compressed format on the receiving device at the second location as a second saved stream of video images;
   g) decompressing the video stream of images in the first digitally compressed format at the receiving device;
   h) displaying the decompressed video stream of images on a display device to the user at the second location as the video stream of images in the first digitally compressed format is being received at the second location;
   i) marking a portion of the displayed stream of video images at the second location based on one or more actions of the user;
   j) returning a request over the computer network from the receiving device to the transmitting device for an enhanced version of the marked portion of the video stream of images;
   k) processing, at the transmitting device, the request for an enhanced version of the marked portion of the video stream of images to determine a subset of images from the saved stream of video images;
   l) converting at least the subset of images to the enhanced second digitally compressed format,
      wherein the second digitally compressed format is a less storage-efficient and less transmission-efficient format having higher quality than the first digitally compressed format,
      wherein the frames of the video stream in the second digitally compressed format contain significantly more information than the first digitally compressed format, and
      wherein the frames of the video stream in the second digital compressed format contain substantially the same quality of information contained in the first saved stream of video images;
   m) transmitting the subset of images in the enhanced second digitally compressed format, corresponding to the marked portion of the video stream of images, over a computer network from the transmitting device to the receiving device at the second location;
   n) saving the subset of images in the second digitally compressed format on the receiving device at the second location;
   o) decompressing the subset of images in the second digitally compressed format at the receiving device; and
   p) displaying the decompressed subset of images in an enhanced decompressed quality on the display device to the user at the second location while the video stream of images in the first digitally compressed format continues to be received at the second location;
   wherein the first location is distinct and remote from the second location, whereby the user at second location views a low quality version of the stream of video images while they are being transmitted, a portion of the displayed video is marked, the marked portion is retransmitted and displayed in higher quality, and the user views the retransmitted portion in higher quality while transmission of the low quality stream of video images continues.

2. The method of claim 1 wherein the subset of images in second digitally compressed format received at the second location replaces the corresponding portion of the second saved stream of video images in the first digitally compressed format on the receiving device.

3. The method of claim 1 wherein the transmitting device is a server in a third location distinct and remote from each of the first and second locations.

4. The method of claim 1 wherein step of marking a portion of the displayed stream of video images at the second location is based on the user actions of:
  i) marking a starting image frame;
  ii) marking an ending image frame; and
  iii) selecting the enhance function;
whereby the user explicitly marks and requests the portion to be retransmitted.

5. The method of claim 1 wherein step of marking a portion of the displayed stream of video images at the second location is based on the user actions of:
  i) rewinding the displayed stream of video images; and
  ii) viewing for a predetermined period of time a previously displayed portion of the stream of video images;
wherein the request is implied by the actions of the user, whereby the user implicitly marks and requests the portion to be retransmitted.

6. The method as claimed in claim 1 wherein the step of generating is performed by a medical test device which is one of the group of an ultrasound, sonogram and echocardiogram device.

7. The method as claimed in claim 1 wherein the step of transferring is performed over an analog video connection.

8. The method as claimed in claim 7 wherein the analog video connection is S-video.

9. The method as claimed in claim 1 wherein the step of transferring is performed over a digital video connection.

10. The method as claimed in claim 1 further comprising a step of adding annotations to at least one image at the second location.

11. The method as claimed in claim 1 wherein if the request for an enhanced version is received while the step of transmitting the video stream of images in the first digitally compressed format is being performed, then the transmission of the video stream of images in the first digitally compressed format is paused while the step of transmitting the subset of images is performed, and resumed once the step of transmitting the subset of images is completed.

12. A method of transmitting a video stream of images over a computer network from a first location to a second location in a first digitally compressed format and then retransmitting, based on one or more actions of a user at the second location, at least a portion of the video stream of images in a higher quality second digitally compressed format, the method comprising the steps of:
  a) generating a plurality of images at a video source device at the first location;
  b) transferring the plurality of images from the video source device to a transmitting device in an original video format as a stream of video images,
  c) converting the stream of video images from the original video format to the first digitally compressed format at the transmitting device;
    wherein the first digitally compressed format is a storage-efficient and transmission-efficient format having lower quality than the second digitally compressed format,
    wherein the frames of the video stream in the first digitally compressed format contain significantly less information than the second digitally compressed format;
  d) transmitting the video stream of images in the first digitally compressed format over the computer network from the transmitting device to a receiving device at the second location;
  e) decompressing the video stream of images in the first digitally compressed format at the receiving device;
  f) displaying the decompressed video stream of images on a display device to the user at the second location;
  g) marking a portion of the displayed stream of video images at the second location based on one or more actions of the user;
  h) returning a request over the computer network from the receiving device to the transmitting device for an enhanced version of the marked portion of the video stream of images;
  i) processing, at the transmitting device, the request for an enhanced version of the marked portion of the video stream of images to determine a subset of images from the stream of video images in the original video format;
  j) converting at least the subset of images to the enhanced second digitally compressed format,
    wherein the second digitally compressed format is a less storage-efficient and less transmission-efficient format having higher quality than the first digitally compressed format,
    wherein the frames of the video stream in the second digitally compressed format contain significantly more information than the first digitally compressed format, and
    wherein the frames of the video stream in the second digital compressed format contain substantially the same quality of information contained in the stream of video images in the original video format;
  k) transmitting the subset of images in the enhanced second digitally compressed format, corresponding to the marked portion of the video stream of images, over the computer network from the transmitting device to the receiving device at the second location;
  l) decompressing the subset of images in the second digitally compressed format at the receiving device; and
  m) displaying the decompressed subset of images in an enhanced decompressed quality on the display device to the user at the second location;
wherein the first location is distinct and remote from the second location, whereby the user at second location views a low quality version of the stream of video images, a portion of the displayed video is marked, the marked portion is retransmitted and displayed in higher quality, and the user views the retransmitted portion in higher quality.

13. The method of claim 12 wherein the subset of images in the second digitally compressed format received at the second location replaces the corresponding portion of the stream of video images in the first digitally compressed format on the receiving device forming an enhanced local movie with at least one enhanced portion.

14. The method of claim 13 wherein the local enhanced movie comprises a first and second subset of images in the second digitally compressed format and wherein the first subset is marked with at least a first mark and the second subset is marked with at least a second mark, the method further comprising a step of skipping from one mark to another mark.

15. The method of claim 13 wherein the enhanced local movie comprises a first mark at the beginning of the subset of images in the second digitally compressed format and a second mark at the end of said subset, the method further comprising a step of skipping from one mark to the other mark.

16. The method of claim 12 wherein the transmitting device is a server in a third location distinct and remote from each of the first and second locations.

17. The method of claim 12 wherein step of marking a portion of the displayed stream of video images at the second location is based on the user actions of:
  i) marking a starting image frame;
  ii) marking an ending image frame; and
  iii) selecting the enhance function;
whereby the user explicitly marks and requests the portion to be retransmitted.

18. The method of claim 17 further comprising a step of skipping from one mark to another mark.

19. The method of claim 12 wherein step of marking a portion of the displayed stream of video images at the second location is based on the user actions of:
  i) rewinding the displayed stream of video images; and
  ii) viewing for a predetermined period of time an previously displayed portion of the stream of video images;
wherein the request is implied by the actions of the user, whereby the user implicitly marks and requests the portion to be retransmitted.

20. The method of claim 12 further comprising a step saving the plurality of images for the video source device on the transmitting device.

21. The method of claim 12 further comprising a step saving the video stream of images in the first digitally compressed format on the receiving device at the second location as a local movie.

22. The method of claim 12 further comprising a step saving the subset of images in the second digitally compressed format on the receiving device at the second location as an enhanced local movie.

23. The method of claim 12 wherein step of converting the stream of video images from the original video format to the first digitally compressed format is performed as each image is received from the video source device at the transmitting device.

24. The method of claim 12 wherein step of displaying the decompressed video stream of images on the display device to the user at the second location is performed as the video stream of images in the first digitally compressed format is being received at the second location.

25. The method of claim 12 wherein step of displaying the decompressed subset of images in an enhanced decompressed quality on the display device to the user at the second location is performed while the video stream of images in the first digitally compressed format continues to be received at the second location,
  whereby the user views the retransmitted portion in higher quality while transmission of the low quality stream of video images continues.

26. A system for transmitting a video stream of images over a digital network from a first location to a second location in a first digitally compressed format and then retransmitting, based on one or more actions of a user at the second location, at least a portion of the video stream of images in a higher quality second digitally compressed format, the system comprising:
  a) a video source device at the first location for generating a plurality of images in an original video format as a stream of video images;
  b) a transmitting device connected to the video source device with a video connection for transferring the plurality of images from the video source device to the transmitting device; and
  c) a receiving device at the second location distinct connected to the transmitting device over the digital network;

wherein:
  i) the first location is distinct and remote from the second location;
  ii) the transmitting device converts the stream of video images from the original video format to the first digitally compressed format,
    (1) wherein the first digitally compressed format is a storage-efficient and transmission-efficient format having lower quality than the second digitally compressed format, and
    (2) wherein the frames of the video stream in the first digitally compressed format contain significantly less information than the second digitally compressed format;
  iii) the transmitting device transmits the video stream of images in the first digitally compressed format over the digital network from the transmitting device to the receiving device;
  iv) the receiving device:
    (1) decompresses the video stream of images in the first digitally compressed format,
    (2) displays the decompressed video stream of images on a display device to the user at the second location,
    (3) marks a portion of the displayed stream of video images based on one or more actions of the user, and
    (4) returns a request over the digital network to the transmitting device for an enhanced version of the marked portion of the video stream of images;
  v) the transmitting device:
    (1) processes the request for an enhanced version of the marked portion of the video stream of images to determine a subset of images from the stream of video images in the original video format,
    (2) converts at least the subset of images to the enhanced second digitally compressed format,
      (a) wherein the second digitally compressed format is a less storage-efficient and less transmission-efficient format having higher quality than the first digitally compressed format, and
      (b) wherein the frames of the video stream in the second digitally compressed format contain significantly more information than the first digitally compressed format, and
    (3) transmits the subset of images in the enhanced second digitally compressed format, corresponding to the marked portion of the video stream of images, over the digital network to the receiving device;
  vi) the receiving device:
    (1) decompresses the subset of images in the second digitally compressed format, and
    (2) displays the decompressed subset of images in an enhanced decompressed quality on the display device to the user at the second location;
whereby the user at second location views a low quality version of the stream of video images, marks a portion of the displayed video, and views the retransmission of the marked portion in higher quality.

27. A transmitting device for transmitting a video stream of images over a network from a first location to a receiving device a second location in a first digitally compressed format and then retransmitting, based on one or more actions of a user at the second location, at least a portion of the video stream of images in a higher quality second digitally compressed format, the transmitting device comprising:
  a) an interface for a video connection for transferring a plurality of images from a video source device in an original video format as a stream of video images;
  b) an interface for a digital connection to the network;
  wherein:
    i) the first location is distinct and remote from the second location;
    ii) the transmitting device converts the stream of video images from the original video format to the first digitally compressed format,
      (1) wherein the first digitally compressed format is a storage-efficient and transmission-efficient format having lower quality than the second digitally compressed format, and
      (2) wherein the frames of the video stream in the first digitally compressed format contain significantly less information than the second digitally compressed format;
    iii) the transmitting device transmits the video stream of images in the first digitally compressed format over the to the receiving device, where the receiving device:
      (1) decompresses the video stream of images in the first digitally compressed format,
      (2) displays the decompressed video stream of images on a display device to the user at the second location,
      (3) marks a portion of the displayed stream of video images based on one or more actions of the user, and
      (4) returns a request over the network to the transmitting device for an enhanced version of the marked portion of the video stream of images;
    iv) the transmitting device processes the request for an enhanced version of the marked portion of the video stream of images to determine a subset of images from the stream of video images in the original video format,
    v) the transmitting device converts at least the subset of images to the enhanced second digitally compressed format,
      (1) wherein the second digitally compressed format is a less storage-efficient and less transmission-efficient format having higher quality than the first digitally compressed format, and
      (2) wherein the frames of the video stream in the second digitally compressed format contain significantly more information than the first digitally compressed format, and
    vi) the transmitting device transmits the subset of images in the enhanced second digitally compressed format, corresponding to the marked portion of the video stream of images, over the network to the receiving device, where the receiving device:
      (1) decompresses the subset of images in the second digitally compressed format, and
      (2) displays the decompressed subset of images in an enhanced decompressed quality on the display device to the user at the second location;
  whereby the user at the second location views a low quality version of the stream of video images, marks a portion of the displayed video, and views the retransmission of the marked portion in higher quality.

28. The transmitting device of claim 27 further comprising
  a) a storage device configured for receiving and storing the stream of images, generated by the source video device in the original video format; and
  b) a controller coupled to the storage device and configured for coupling to the receiving device for controlling transmission of the stream of images from the storage device to the receiving device, wherein the stream of images are transmitted to the receiving device in the first format and then a requested portion of the stream of images are transmitted to the receiving device in the second format.

29. The transmitting device as claimed in claim 27 wherein the source video device is a medical test device which is one of an ultrasound, a sonogram and an echocardiogram.

30. The transmitting device as claimed in claim 27 further comprising a network interface circuit coupled to the storage device and to the controller for communicating with the receiving device over the network.

31. The transmitting device as claimed in claim 27 wherein the network is an Internet Protocol network.

32. The transmitting device as claimed in claim 27 wherein received frames within the stream of images are displayed at the receiving device while a remaining portion of the stream of images is transmitted.

33. The transmitting device as claimed in claim 31 wherein the receiving device further includes a received storage device for storing the steam of images.

34. The transmitting device as claimed in claim 33 wherein the requested portion of the stream of images is stored in the second format and a remaining portion of the stream of images is stored in the first format at the received storage device.

* * * * *